United States Patent [19]

Kashima et al.

[11] Patent Number: 4,522,927

[45] Date of Patent: Jun. 11, 1985

[54] DIELECTRIC CERAMIC COMPOSITION

[75] Inventors: Masao Kashima; Noboru Tomuro, both of Yokoze, Japan

[73] Assignees: Mitsubishi Mining; Cement Company Ltd., both of Tokyo, Japan

[21] Appl. No.: 545,523

[22] Filed: Oct. 26, 1983

Related U.S. Application Data

[63] Continuation-in-part of Ser. No. 451,929, Dec. 21, 1982, abandoned.

[30] Foreign Application Priority Data

Aug. 13, 1982 [JP] Japan ................... 57-139696

[51] Int. Cl.³ ........................... C04B 35/49
[52] U.S. Cl. ................... 501/139; 501/138
[58] Field of Search ................... 501/138, 139

[56] References Cited

FOREIGN PATENT DOCUMENTS

| 50-20280 | 7/1975 | Japan | 501/139 |
| 53-74298 | 7/1978 | Japan | 501/139 |
| 57-61667 | 4/1982 | Japan | 501/139 |
| 57-90808 | 6/1982 | Japan | 501/139 |
| 1431103 | 4/1975 | United Kingdom | 501/139 |
| 1442285 | 7/1976 | United Kingdom | 501/139 |

Primary Examiner—Mark Bell
Attorney, Agent, or Firm—Wegner & Bretschneider

[57] ABSTRACT

A dielectric ceramic composition having a composition represented by the formula $$xBaO - yNd_2O_3 - z(Ti_{1-m}Zr_m)O_2$$

wherein $x + y + z = 1.00$ $$0 < m \leq 0.25$$

and x, y, and z are in the molar ratio region surrounded by the points a, b, c, and d which are represented by the following x-y-z coordinates:

|   | x    | y    | z    |
|---|------|------|------|
| a | 0.15 | 0.12 | 0.73 |
| b | 0.15 | 0.18 | 0.67 |
| c | 0.05 | 0.18 | 0.77 |
| d | 0.05 | 0.12 | 0.83 |

2 Claims, 1 Drawing Figure

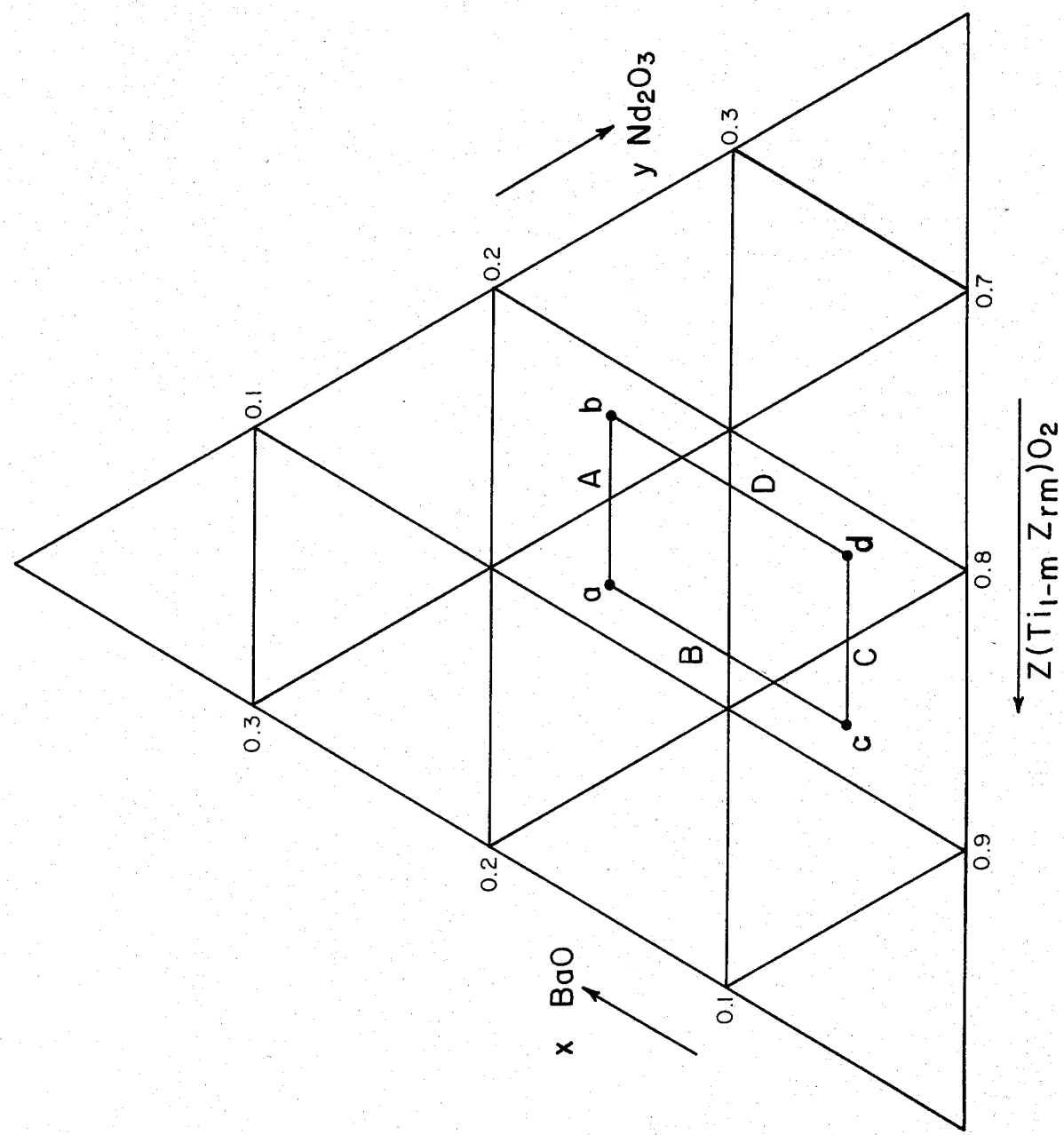

DIELECTRIC CERAMIC COMPOSITION

BACKGROUND OF THE INVENTION

This application is a continuation-in-part of our co-pending application Ser. No. 451,929, filed Dec. 21, 1982, now abandoned.

FIELD OF THE INVENTION

This invention relates to a dielectric ceramic composition having a high dielectric constant and a low degree of temperature dependency of dielectric constant, which can be prepared at a relatively low firing temperature.

The following systems have hitherto been known as temperature-compensating dielectric porcelain compositions:

MgO-$TiO_2$-CaO system
$La_2O_3$.$2TiO_2$-$CaTiO_3$-$2MgO$.$TiO_2$ system
$TiO_2$-$BaTiO_3$-$Bi_2O_3$-$La_2O_3$ system However, these compositions have low dielectric constants and are disadvantageous in that baking temperatures for their production are relatively high. Moreover, Pd cannot be used as internal electrodes for laminated condensers formed from $Bi_2O_3$-containing compositions because $Bi_2O_3$ attacks Pd electrodes.

SUMMARY OF THE INVENTION

The primary object of this invention is to provide a dielectric ceramic composition free from such disadvantages as mentioned above, that is, a composition of sufficiently high dielectric constant, containing no $Bi_2O_3$, which can be produced by a lower temperature firing.

Another object of this invention is to provide a dielectric ceramic composition exhibiting minimum temperature dependency of dielectric constant.

Thus, this invention provides a dielectric ceramic composition having a composition represented by the formula $$xBaO - yNd_2O_3 - z(Ti_{1-m}Zr_m)O_2$$

wherein, $x+y+z=1.00$, $$0 < m \leq 0.25$$

and x, y, and z are in the molar ratio region surrounded by the points a, b, c, and d which are represented by the following x-y-z coordinates:

|   | x | y | z |
|---|---|---|---|
| a | 0.15 | 0.12 | 0.73 |
| b | 0.15 | 0.18 | 0.67 |
| c | 0.05 | 0.18 | 0.77 |
| d | 0.05 | 0.12 | 0.83 |

BRIEF DESCRIPTION OF THE DRAWING

The drawing is a ternary system composition diagram showing the proportion ranges of essential components of the composition of this invention.

DETAILED DESCRIPTION OF THE INVENTION

The dielectric ceramic composition of this invention consists mainly of $xBaO$, $yNd_2O_3$, and $z(Ti_{1-m}Zr_m)O_2$, wherein $x+y+z=1.00$, $0<m\leq 0.25$, and x, y, and z are in the parallelogram formed, as shown in the drawing, connecting the pairs of points a-b, b-d, d-c, and c-a.

Reasons for limiting the proportions of the main components of the present invention to said region are explained below with reference to the drawing. In A-region (A-, B-, C-, and D-regions are out of the scope of this invention), the raw material mixtures are difficult to sinter, the sintering is insufficient, and the compositions exhibit decreased values of Q. In B-region, the temperature coefficient of capacitance is excessively large on the negative side, being unsuited for practical use. In C-region, said temperature coefficient is excessively large on the positive side and the dielectric constant is undesirably low. In D-region, the temperature coefficient is excessively large on the positive side, the dielectric constant is undesirably low, and the sintering is extremely difficult. The dielectric constant becomes low when $Nd_2O_3$ is less than 12 mol% or is more than 18 mol%. In the range of $0<m\leq 0.25$, the sintering is easy; increasing m shifts the temperature coefficient toward the positive side; in this case, a composition of high dielectric constant is obtained in the vicinity of NPO by selecting a proper composition. When m exceeds 0.25, the sintering becomes difficult and Q decreases.

The composition of this invention may contain, besides the essential components mentioned above, at least one member selected from oxides of manganese, chromium, iron, nickel, and cobalt in amounts of 0.05-1.00% by weight of the total weight of the main components, in terms each of $MnO_2$, $Cr_2O_3$, FeO, NiO, and CoO. These additives have an effect of improving sintering properties of the raw material mixture. The total content of these additives, when less than 0.05% by weight, has no such effect, and when exceeding 1.00% by weight, results in a decrease in dielectric constant.

This invention will be illustrated in more detail by the following examples, which are however not to be construed to limit the scope of this invention.

EXAMPLE 1

Raw materials, $BaCo_3$, $Nd_2O_3$, $TiO_2$, and $ZrO_2$, were mixed in different compounding ratios so that the fired products might contain components in proportions as shown in Table 1. The resulting mixtures were calcined in air at 1000° C. for 2 hours. The calcined materials were pulverized, mixed with an organic binder, and shaped into thin circular pieces of 16 mm in diameter and 0.6 mm in thickness by applying a molding pressure of 3 ton/cm². Samples Nos. 1–36 were obtained by firing these places for one hour at the individual temperatures shown in Table 1.

Electrical properties of these samples were determined by plating both faces of each specimen with a silver electrode, and using a YHP digital LCR meter (Model 4274A, supplied by YHP, Tokyo, Japan) and YHP Q-meter (Model 4342A, supplied by YHP, Tokyo, Japan) under measuring conditions of temperature 25° C., voltage 1.0 vrms and frequency of 100 $KH_Z$ (except 1 $MH_Z$ for Q value). The temperature coefficient of capacitance was determined on the basis of the value of capacitance by the following equation Temperature coefficient $= (C_{85} - C_{25})/(C_{25} \times 60) \times 10^6 \text{(ppm/°C.)}$ preparation conditions for the samples and results of the measurement are shown in Table 1.

TABLE 1

| Sample No. | Component proportion (mol %) | | | m | Firing Temp. (°C.) | Dielectric Properties | | Temperature Coefficient of capacitance (ppm/°C.) |
| | x BaO | y $Nd_2O_3$ | z $(Ti_{1-m}Zr_m)O_2$ | | | $\epsilon_s$ | Q | |
| --- | --- | --- | --- | --- | --- | --- | --- | --- |
| 1 | 15 | 17 | 68 | 0.10 | 1270 | 83 | 6000 | −43 |
| 2 | 15 | 17 | 68 | 0.15 | 1290 | 80 | 5500 | −15 |
| 3 | 15 | 17 | 68 | 0.20 | 1300 | 76 | 5000 | 0 |
| 4 | 12 | 18 | 70 | 0.05 | 1250 | 74 | 8300 | −25 |
| 5 | 12 | 18 | 70 | 0.07 | 1250 | 73 | 7600 | −4 |
| 6 | 12 | 18 | 70 | 0.10 | 1250 | 72 | 6800 | +15 |
| 7 | 10 | 18 | 72 | 0.07 | 1250 | 72 | 7500 | −30 |
| 8 | 10 | 18 | 72 | 0.10 | 1250 | 68 | 8700 | −15 |
| 9 | 12 | 16 | 72 | 0.10 | 1250 | 74 | 7800 | −40 |
| 10 | 12 | 16 | 72 | 0.15 | 1250 | 72 | 7500 | −22 |
| 11 | 12 | 16 | 72 | 0.20 | 1270 | 67 | 7000 | −5 |
| 12 | 10 | 16 | 74 | 0.15 | 1270 | 68 | 7500 | −30 |
| 13 | 10 | 16 | 74 | 0.20 | 1290 | 64 | 7200 | −15 |
| 14 | 10 | 16 | 74 | 0.25 | 1310 | 61 | 7000 | 0 |
| 15 | 7.5 | 16.5 | 76 | 0.10 | 1250 | 81 | 6500 | −32 |
| 16 | 7.5 | 16.5 | 76 | 0.15 | 1270 | 79 | 6200 | 0 |
| 17 | 5 | 17 | 78 | 0.15 | 1290 | 92 | 6000 | −175 |
| 18 | 5 | 17 | 78 | 0.20 | 1310 | 88 | 6000 | −154 |
| 19 | 5 | 17 | 78 | 0.25 | 1330 | 85 | 5400 | −136 |
| 20 | 10 | 12 | 78 | 0.15 | 1300 | 78 | 5000 | −118 |
| 21 | 10 | 12 | 78 | 0.20 | 1310 | 74 | 4500 | −96 |
| 22 | 10 | 12 | 78 | 0.25 | 1330 | 70 | 4000 | −75 |
| 23 | 15 | 12 | 73 | 0.10 | 1290 | 74 | 6000 | −61 |
| 24 | 15 | 12 | 73 | 0.15 | 1310 | 68 | 5800 | −25 |
| 25 | 15 | 12 | 73 | 0.20 | 1330 | 66 | 5200 | −10 |
| 26 | 15 | 18 | 67 | 0.10 | 1270 | 85 | 6000 | −50 |
| 27 | 15 | 18 | 67 | 0.15 | 1290 | 80 | 5300 | −12 |
| 28 | 15 | 18 | 67 | 0.20 | 1310 | 77 | 5000 | +11 |
| 29 | 5 | 18 | 77 | 0.07 | 1290 | 65 | 7000 | −90 |
| 30 | 5 | 18 | 77 | 0.10 | 1310 | 60 | 6500 | −75 |
| 31 | 5 | 12 | 83 | 0.15 | 1310 | 87 | 4500 | −125 |
| 32 | 5 | 12 | 83 | 0.20 | 1330 | 82 | 4100 | −157 |
| 33 | 12 | 14 | 74 | 0.10 | 1270 | 70 | 7100 | −100 |
| 34 | 12 | 14 | 74 | 0.15 | 1270 | 68 | 6700 | −78 |
| 35 | 7.5 | 14 | 78.5 | 0.05 | 1300 | 80 | 6000 | −135 |
| 36 | 7.5 | 14 | 78.5 | 0.10 | 1310 | 77 | 5700 | −111 |

TABLE 2

| Sample No. | Component proportion | | | m | Additive | Amount of Additive (wt %) | Firing temp (°C.) | Dielectric Properties | | Temperature Coefficient of capacitance (ppm/°C.) |
| | x BaO | y $Nd_2O_3$ | z $(Ti_{1-m}Zr_m)O_2$ | | | | | $\epsilon_s$ | Q | |
| --- | --- | --- | --- | --- | --- | --- | --- | --- | --- | --- |
| 37 | 7.5 | 16.5 | 76 | 0.15 | $MnO_2$ | 0.05 | 1260 | 78 | 6500 | −5 |
| 38 | 7.5 | 16.5 | 76 | 0.15 | $MnO_2$ | 0.10 | 1250 | 80 | 6300 | −10 |
| 39 | 7.5 | 16.5 | 76 | 0.15 | $MnO_2$ | 0.20 | 1240 | 64 | 6600 | −27 |
| 40 | 10 | 16 | 74 | 0.25 | $Cr_2O_3$ | 0.40 | 1270 | 57 | 7200 | −29 |
| 41 | 15 | 17 | 68 | 0.20 | NiO | 0.80 | 1270 | 51 | 6100 | −32 |
| 42 | 12 | 18 | 70 | 0.10 | FeO | 0.20 | 1250 | 70 | 6500 | −112 |
| 43 | 10 | 12 | 78 | 0.15 | CoO | 0.50 | 1270 | 77 | 5000 | −110 |

As shown in Table 1, all the samples have a high dielectric constant, small temperature dependency of capacitance, and a Q-value sufficient for practical use and can be prepared by firing at relatively low temperatures.

EXAMPLE 2

Samples Nos. 37–43 were prepared and measured for dielectric properties in the same manner as in Example 1 except that $MnO_2$, $Cr_2O_3$, Feo, Nio, or CoO was added to raw materials, $BaCO_3$, $Nd_2O_3$, $TiO_2$, and $ZrO_2$, so as to give the baked product component proportions shown in Table 2. The results are shown in Table 2.

As can be seen from Table 2, the firing temperature could be lowered by addition of $MnO_2$, $Cr_2O_3$, FeO, or CoO.

What is claimed is:

1. A dielectric ceramic composition having a composition represented by the formula $$xBaO-yNd_2O_3-z(Ti_{1-m}Zr_m)O_2$$

wherein $x+y+z=1.00$, m is between 0.05 and 0.25, and x, y, and z are in the molar ratio region surrounded by the points a, b, c, and d which are represented by the following x-y-z coordinates:

| | x | y | z |
| --- | --- | --- | --- |
| a | 0.15 | 0.12 | 0.73 |
| b | 0.15 | 0.18 | 0.67 |

-continued

|   | x | y | z |
|---|---|---|---|
| c | 0.05 | 0.18 | 0.77 |
| d | 0.05 | 0.12 | 0.83 | said composition being free of bismuth.

2. A dielectric ceramic composition according to claim 1, which contains, besides said main components, at least one member selected from oxides of manganese, chromium, iron, nickel, and cobalt in amounts of 0.05–100% by weight of the total weight of the main components, in terms each of $MnO_2$, $Cr_2O_3$, FeO, NiO, and CoO.

* * * * *